US008943373B1

(12) United States Patent
Angaluri et al.

(10) Patent No.: US 8,943,373 B1
(45) Date of Patent: Jan. 27, 2015

(54) KEYBOARD, VIDEO AND MOUSE SWITCH IDENTIFYING AND DISPLAYING NODES EXPERIENCING A PROBLEM

(71) Applicant: International Business Machines Corporation, Armonk, NY (US)

(72) Inventors: Srihari V. Angaluri, Raleigh, NC (US); Gary D. Cudak, Creedmoor, NC (US); Christopher J. Hardee, Raleigh, NC (US); Bryan M. Reese, Durham, NC (US); Junjiro Sumikawa, Cary, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/036,187

(22) Filed: Sep. 25, 2013

(51) Int. Cl.
*G06F 3/00* (2006.01)
*G06F 11/00* (2006.01)
*G06F 11/07* (2006.01)

(52) U.S. Cl.
CPC .................................. *G06F 11/0769* (2013.01)
USPC .................................. 714/57; 710/15; 710/18

(58) Field of Classification Search
CPC ............................. G06F 13/10; G09G 2370/24
USPC ........................................ 710/15, 18; 714/57
See application file for complete search history.

(56) References Cited

U.S. PATENT DOCUMENTS

| | | | |
|---|---|---|---|
| 5,802,146 A * | 9/1998 | Dulman | 379/32.03 |
| 6,000,040 A | 12/1999 | Culley et al. | |
| 6,618,821 B1 | 9/2003 | Duncan et al. | |
| 6,892,069 B1 * | 5/2005 | Flynn | 455/432.1 |
| 7,272,635 B1 * | 9/2007 | Longtin et al. | 709/208 |
| 7,689,704 B2 | 3/2010 | de Kerf | |
| 2004/0153863 A1 * | 8/2004 | Klotz et al. | 714/45 |
| 2007/0094426 A1 * | 4/2007 | Chiang et al. | 710/73 |
| 2009/0031417 A1 * | 1/2009 | Horikawa | 726/17 |
| 2010/0049890 A1 * | 2/2010 | Best et al. | 710/73 |
| 2010/0095030 A1 * | 4/2010 | Chiu | 710/67 |
| 2011/0279844 A1 * | 11/2011 | Urasawa | 358/1.13 |
| 2012/0173755 A1 | 7/2012 | Margulis | |
| 2012/0173779 A1 | 7/2012 | Holovacs et al. | |
| 2012/0331212 A1 | 12/2012 | Batish et al. | |
| 2013/0054601 A1 * | 2/2013 | Whitlock et al. | 707/737 |

FOREIGN PATENT DOCUMENTS

CN 102023915 A 4/2011

OTHER PUBLICATIONS

Beiyu Ren, "Device and method for monitoring and managing keyboard, video and mouse", CN102023915 English Abstract, Apr. 20, 2011, 8 pages.

* cited by examiner

*Primary Examiner* — Farley Abad
(74) *Attorney, Agent, or Firm* — Katherine S. Brown; Jeffrey L. Streets

(57) ABSTRACT

A computer program product includes computer readable program code causing a keyboard, video and mouse (KVM) switch to communicate over a network with service processors of a plurality of compute nodes, computer readable program code for causing the KVM switch to identify a compute node from among the plurality of compute nodes that is experiencing one or more predetermined problems, and computer readable program code for causing the KVM switch to automatically generate a graphical user interface including the identity of the identified compute node for display on a display device that is connected to the KVM switch.

17 Claims, 4 Drawing Sheets

60

| Main Menu | | | |
|---|---|---|---|
| Name | Type | Stat | |
| 2 PORT 02 | USB | OFF | 1 |
| 3 PORT 03 | USB | OFF | — |
| 4 PORT 04 | USB | OFF | — |
| 5 PORT 05 | USB | OFF | — |
| 6 PORT 06 | USB | OFF | — |
| 7 PORT 07 | USB | OFF | — |
| 8 PORT 08 | USB | OFF | — |
| 9 PORT 09 | USB | OFF | — |

Sharing=N
Admin    Settings    List    Logout
Scan=N   B Cast=N    Find    F1 :Help

| Main Menu | | | |
|---|---|---|---|
| Name | Type | Stat | |
| 2 PORT 02 | USB | OFF | 1 |
| 3 PORT 03 | USB | OFF | — |
| 4 PORT 04 | USB | OFF | — |
| 5 PORT 05 | USB | OFF | — |
| 6 PORT 06 | USB | OFF | — |
| 7 PORT 07 | USB | OFF | — |
| 8 PORT 08 | USB | OFF | — |
| 9 PORT 09 | USB | OFF | — |

Sharing=N
Admin    Settings    List    Logout
Scan=N   B Cast=N    Find    F1 :Help

| | Main Menu | | |
|---|---|---|---|
| Name | | Type | Stat |
| 2 PORT 02 | | USB | OFF 1 |
| 3 PORT 03 | | USB | OFF — |
| 4 PORT 04 | Overtemp | USB | OFF — |
| 5 PORT 05 | | USB | OFF — |
| 6 PORT 06 | | USB | OFF — |
| 7 PORT 07 | | USB | OFF — |
| 8 PORT 08 | | USB | OFF — |
| 9 PORT 09 | | USB | OFF — |

Admin   Settings   List   Sharing=N  Logout
Scan=N   B Cast=N   Find   F1 :Help

FIG. 6

Main Menu

| Name | Type | Stat |
|---|---|---|
| 4 PORT 04 | USB | OFF — |

Admin   Settings   List   Sharing=N  Logout
Scan=N   B Cast=N   Find   F1 :Help

KEYBOARD, VIDEO AND MOUSE SWITCH IDENTIFYING AND DISPLAYING NODES EXPERIENCING A PROBLEM

BACKGROUND

1. Field of the Invention

The present invention relates to methods of operating a keyboard, video and mouse (KVM) switch.

2. Background of the Related Art

In a datacenter or other facility, there may be many compute nodes in a small amount of space. While a system administrator may need occasional direct access to each of the compute nodes, there isn't enough space for each compute node to have a dedicated keyboard, video display, or mouse. Furthermore, such a large scale duplication of these input/output devices would greatly increase the cost of the system.

As a result, keyboard, video and mouse (KVM) switches were developed so that a single keyboard, video display device and mouse could be selectively connected to operate any of the compute nodes that were connected to the KVM switch. While the original KVM switches were mechanical, modern KVM switches are controlled by a processor running a KVM switch interface program. These "console switches" may be configured to access over 2000 compute nodes from a single keyboard, video display, and mouse.

BRIEF SUMMARY

One embodiment of the present invention provides a method, comprising a keyboard, video and mouse (KVM) switch communicating over a network with service processors of a plurality of compute nodes, the KVM switch identifying a compute node from among the plurality of compute nodes that is experiencing one or more predetermined problems, and the KVM switch automatically generating a graphical user interface including the identity of the identified compute node for display on a display device that is connected to the KVM switch.

Another embodiment of the present invention provides a computer program product including computer readable program code embodied on a computer readable storage medium. The computer program product includes computer readable program code causing a keyboard, video and mouse (KVM) switch to communicate over a network with service processors of a plurality of compute nodes, computer readable program code for causing the KVM switch to identify a compute node from among the plurality of compute nodes that is experiencing one or more predetermined problems, and computer readable program code for causing the KVM switch to automatically generate a graphical user interface including the identity of the identified compute node for display on a display device that is connected to the KVM switch.

BRIEF DESCRIPTION OF THE SEVERAL VIEWS OF THE DRAWINGS

FIGS. 3-6 are examples of a graphical user interface that may be output in accordance with various embodiments of the invention.

DETAILED DESCRIPTION

Figure 1:
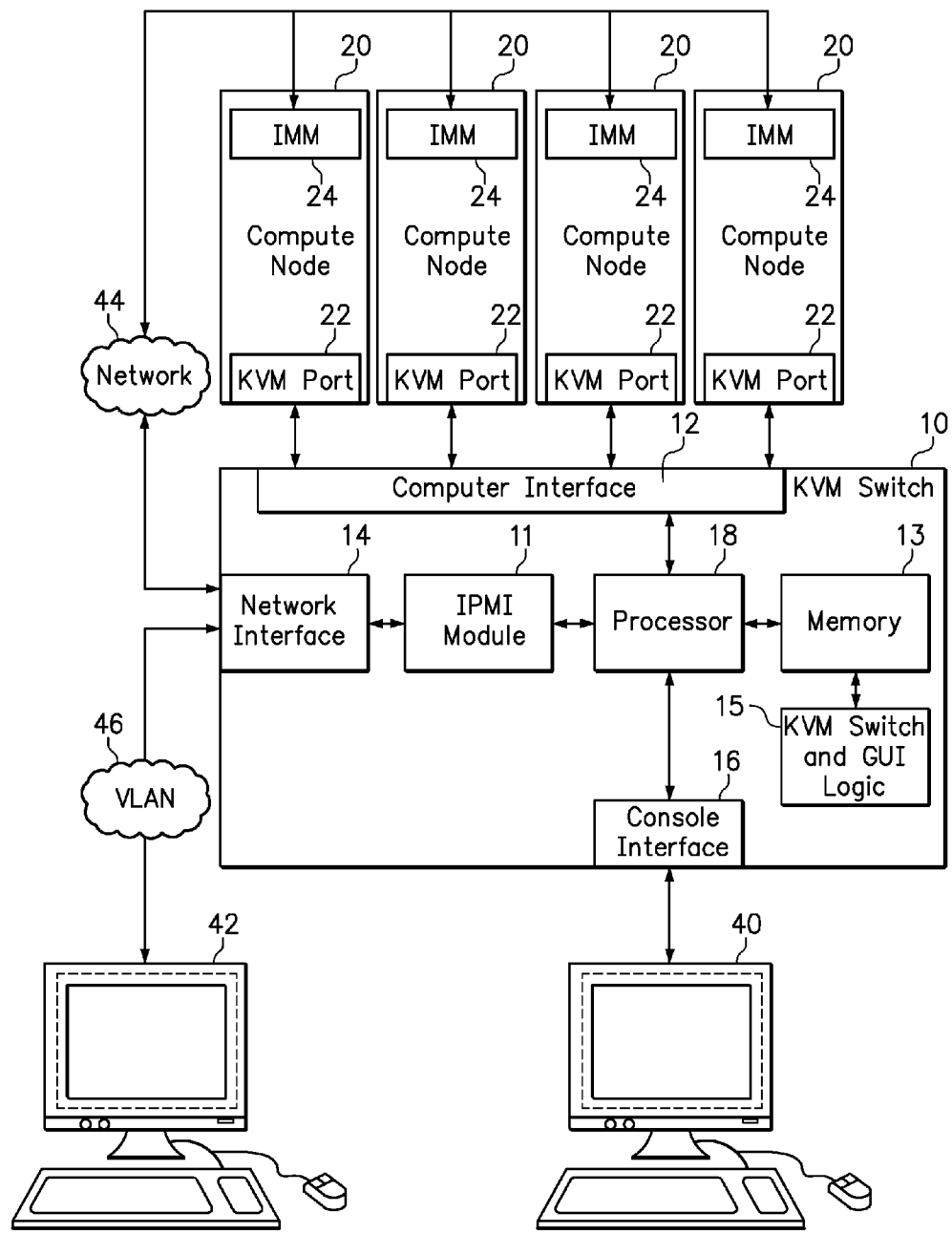
FIG. 1 is a diagram of a keyboard, video and mouse (KVM) switch connecting a plurality of compute nodes to a local console or a remote console.

One embodiment of the present invention provides a method, comprising a keyboard, video and mouse (KVM) switch communicating over a network with service processors of a plurality of compute nodes, the KVM switch identifying a compute node from among the plurality of compute nodes that is experiencing one or more predetermined problems, and the KVM switch automatically generating a graphical user interface including the identity of the identified compute node for display on a display device that is connected to the KVM switch.

The one or more predetermined problems may be any problem that is detectable. More specifically, the KVM switch can detect whether a compute node has become unreachable and the KVM switch can receive system reports from the service processors of the compute nodes. The system reports identify errors in the operating system running on a compute node or other errors or malfunctions observed by the service processor. In one embodiment, the one or more predetermined problems are selected from an inability to communicate over the network, an operating system error, and a service processor error. The method will preferably further include displaying an indicator of the one or more predetermined problem, such as an error message, along with the identity of the identified compute node on the graphical user interface.

Another embodiment of the method includes the KVM switch automatically switching to connect the display device to the identified compute node. The display device is typically part of a local console or remote console that also includes a keyboard and a mouse. Accordingly, a user can immediate begin to address the one or more predetermined problems associated with the identified compute node. Optionally, the method may require users to log into a user account before gaining access to use the keyboard, video and mouse switch, wherein automatic switching of the keyboard, video and mouse switch to connect the display device to the identified compute node is only available to a user account that has been assigned automatic switching privileges.

In further embodiments of the invention, the keyboard, video and mouse switch uses intelligent platform management interface (IPMI) commands to communicate with the service processors of the plurality of compute nodes. For this purpose, the KVM switch may include an IPMI module facilitating communication between a processor in the KVM switch and the service processor in each of the compute nodes.

In a still further embodiment, the KVM switch communicates over a network with the service processors of the plurality of compute nodes by polling the service processor of each of the plurality of compute nodes. Polling allows the KVM switch to request information, such as whether the service processor has observed certain errors, or to determine whether the service processor is unreachable over the network.

In yet another embodiment, any of the compute nodes may send a signal through a keyboard, video, or mouse input/output port on the compute node that is connected to the keyboard, video and mouse switch. One example of such a signal is a predetermined sequence or combination of keyboard, mouse or video signals. Preferably, the signal is a predetermined sequence or combination of keyboard, mouse or video signals that would not be manually physically reproducible by a user. One non-limiting example is three mouse right-click signals transmitted at a rate that is physically impossible to manually generate.

Other embodiments of the invention include distinguishing the manner in which the identified compute node is displayed on the graphical user interface. Typically, the graphical user interface will list or otherwise display all or many of the plurality of the compute nodes. However, the identified compute node or nodes may be distinguished using a visual effect associated with displaying the name of the compute node on the graphical user interface. Such a visual effect may, for example, be selected from highlighting the background, outlining, changing the font, changing the color, blinking, shaking, scrolling and combinations thereof.

The methods of the present invention may further include filtering a list of the plurality of compute nodes to display only those compute nodes from among the plurality of compute nodes that are experiencing one or more of the predetermined problems. This will assist a user in locating those compute nodes having a problem, and allow them to manually select from among those compute nodes and access the selected compute node from a console. As an alternative to filtering, the method may reordering a list of the plurality of compute nodes to display those compute nodes from among the plurality of compute nodes that are experiencing one or more of the predetermined problems at the top of the list, or any other designated position on the list.

Another embodiment of the present invention provides a computer program product including computer readable program code embodied on a computer readable storage medium. The computer program product includes computer readable program code causing a keyboard, video and mouse (KVM) switch to communicate over a network with service processors of a plurality of compute nodes, computer readable program code for causing the KVM switch to identify a compute node from among the plurality of compute nodes that is experiencing one or more predetermined problems, and computer readable program code for causing the KVM switch to automatically generate a graphical user interface including the identity of the identified compute node for display on a display device that is connected to the KVM switch.

The foregoing computer program products may further include computer readable program code for implementing or initiating any one or more aspects of the methods described herein. Accordingly, a separate description of the methods will not be duplicated in the context of a computer program product.

FIG. 1 is a diagram of a keyboard, video and mouse (KVM) switch 10 connecting a plurality of compute nodes 20 to a local console 40 or a remote console 42. The KVM switch 10 includes a computer interface 12 for connecting the KVM switch to the KVM port 22 (such as a DB15 or USB/PS2 port) on each of the plurality of compute nodes 20, and a network interface 14 for facilitating communication with the service processors (integrated management modules (IMMs) 24) of the plurality of compute nodes 20 over a network 44. Still further, the KVM switch 10 includes a console interface 16 connecting to the local console 40. Similarly, a remote console 42 may be used instead of, or in addition to, the local console 40, where the remote console 42 communicates over a virtual local area network (VLAN) 46 to the network interface 14. The IMM may be considered to serve as a baseboard management controller (BMC) with enhanced functionality, include remote supervisory capabilities.

A processor 18 controls the KVM switch 10 and can selectively control the switch to place the local console 40 in direct operational communication with the KVM port 22 of any selected compute node from among the plurality of compute nodes 20. The processor 18 also instructs an IPMI module 11 to send IPMI commands through the network interface 14 and over the network 44 to the IMM 24 of a selected compute node 20. The processor 18 accesses memory 13 that stores KVM switch and graphical user interface logic 15 and executes that logic in a manner consistent with embodiments of the invention described herein. One non-limiting example of these embodiments is shown in reference to FIG. 2.

Figure 2:
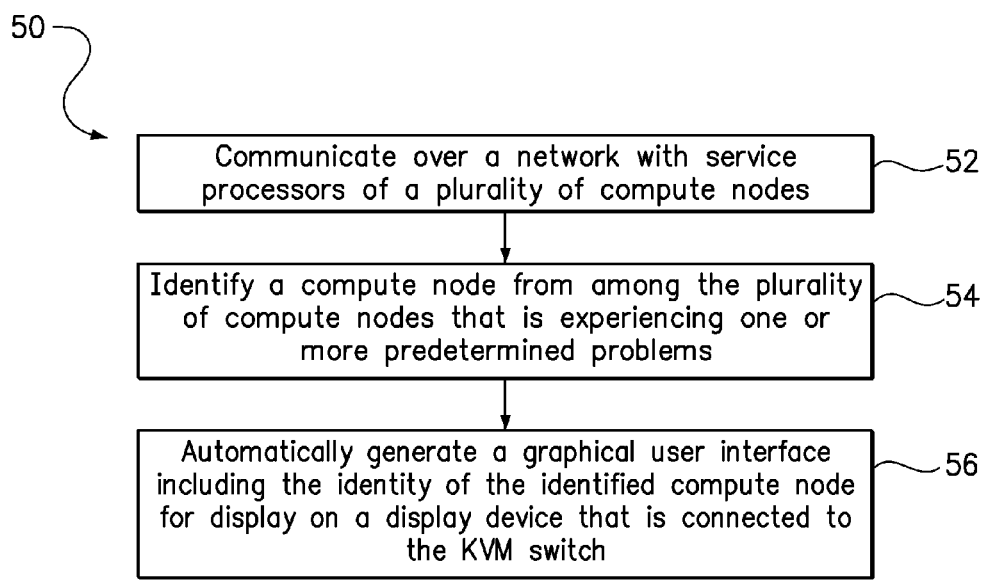
FIG. 2 is a flowchart of a method of controlling a KVM switch.

FIG. 2 is a flowchart of a method 50 of controlling a KVM switch. In step 52, the KVM switch communicates over a network with service processors of a plurality of compute nodes. In step 54, the KVM switch identifies a compute node, from among the plurality of compute nodes, that is experiencing one or more predetermined problems. Then, in step 56, the KVM switch automatically generates a graphical user interface including the identity of the identified compute node for display on a display device that is connected to the KVM switch. Optionally, any other aspect of the methods described above may also be included in the method.

FIGS. 3-6 are examples of a graphical user interface 60 that may be output to a video display (see local console 40 in FIG. 1) in accordance with various embodiments of the invention. In each of FIGS. 3-6, the graphical user interface 60 includes a list of compute nodes ("Name" of port number) along with a port type and status information. According to the KVM switch and GUI logic (element 15 of FIG. 1), the GUI 60 is prepared using information collected from the compute nodes 20, and selection of a compute node from the list using the GUI 60 can cause the KVM switch (element 10 of FIG. 1) to operate the switch to connect the local console to the selected compute node. In order to show that the KVM switch has identified a particular compute node from among the plurality of compute nodes as experiencing one or more predetermined problems, the name of the particular compute node is distinguished. In FIG. 3, the plurality of compute nodes are listed. In FIG. 4, the compute node attached to "PORT 04" has been highlighted as having a problem. In FIG. 5, the compute node attached to "PORT 04" has an error message "Overtemp" included in the same line of the list. In FIG. 6, the compute node attached to "PORT 04" has been filtered out from the list as having a problem.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product including computer readable program code embodied on a non-transitory computer readable storage medium, the computer program product including:

computer readable program code for causing a keyboard, video and mouse (KVM) switch to communicate over a network with service processors of a plurality of compute nodes;

computer readable program code for causing the KVM switch to identify a compute node from among the plurality of compute nodes that is experiencing one or more predetermined problems in response to receiving an error message from a service processor of the identified compute node, wherein the error message identifies the one or more predetermined problems; and computer readable program code for causing the KVM switch to automatically generate a graphical user interface including the identity of the identified compute node for display on a display device that is connected to the KVM switch.

2. The computer program product of claim 1, wherein the one or more predetermined problems is selected from an inability to communicate over the network, an operating system error, and a service processor error.

3. The computer program product of claim 1, further comprising:

computer readable program code causing the keyboard, video and mouse switch to automatically switch to connect the display device to the identified compute node.

4. The computer program product of claim 3, further comprising:

computer readable program code for requiring users to log into a user account before gaining access to use the keyboard, video and mouse switch; and computer readable program code for causing the keyboard, video and mouse switch to automatically switch to connect the display device to the identified compute node is only available to a user account that has been assigned automatic switching privileges.

5. The computer program product of claim 1, wherein the keyboard, video and mouse switch uses intelligent platform management interface (IPMI) commands to communicate with the service processors of the plurality of compute nodes.

6. The computer program product of claim 1, further comprising:

computer readable program code for distinguishing the manner in which the identified compute node is displayed on the graphical user interface, wherein the identified compute node is displayed along with the plurality of the compute nodes.

7. The computer program product of claim 6, wherein distinguishing the manner in which the identified compute node is displayed on the graphical user interface is a visual effect selected from highlighting background, outlining, font change, color change, blinking, shaking, scrolling and combinations thereof.

8. The computer program product of claim 1, further comprising:

computer readable program code for filtering a list of the plurality of compute nodes to display only those compute nodes from among the plurality of compute nodes that are experiencing one or more of the predetermined problems.

9. The computer program product of claim 1, further comprising:

computer readable program code for reordering a list of the plurality of compute nodes to display those compute nodes from among the plurality of compute nodes that are experiencing one or more of the predetermined problems at the top of the list.

10. The computer program product of claim 1, further comprising:

computer readable program code for displaying the error message along with the identity of the identified compute node on the graphical user interface.

11. A computer program product including computer readable program code embodied on a non-transitory computer readable storage medium, the computer program product including:

computer readable program code for causing a keyboard, video and mouse (KVM) switch to communicate over a network with service processors of a plurality of compute nodes, wherein the keyboard video and mouse switch polls the service processor of each of the plurality of compute nodes;

computer readable program code for causing the KVM switch to identify a compute node from among the plurality of compute nodes that is unreachable over the network; and computer readable program code for causing the keyboard, video and mouse switch to receive a signal from the identified compute node through a keyboard, video, or mouse input/output port of the identified compute node connected to the keyboard, video and mouse switch, wherein the signal identifies one or more predetermined problems experienced by the identified compute node; and computer readable program code for causing the KVM switch to automatically generate a graphical user interface including the identity of the identified compute node for display on a display device that is connected to the KVM switch.

12. The computer program product of claim 11, wherein the signal is a predetermined sequence or combination of keyboard, mouse or video signals.

13. The computer program product of claim 11, further comprising:

computer readable program code for distinguishing the manner in which the identified compute node is displayed on the graphical user interface, wherein the identified compute node is displayed along with the plurality of the compute nodes.

14. The computer program product of claim 13, wherein distinguishing the manner in which the identified compute node is displayed on the graphical user interface is a visual effect selected from highlighting background, outlining, font change, color change, blinking, shaking, scrolling and combinations thereof.

15. The computer program product of claim 11, further comprising:

computer readable program code for filtering a list of the plurality of compute nodes to display only those compute nodes from among the plurality of compute nodes that are experiencing one or more of the predetermined problems.

16. The computer program product of claim 11, further comprising:

computer readable program code for reordering a list of the plurality of compute nodes to display those compute nodes from among the plurality of compute nodes that are experiencing one or more of the predetermined problems at the top of the list.

17. The computer program product of claim 11, further comprising:

computer readable program code for displaying the error message along with the identity of the identified compute node on the graphical user interface.

* * * * *